(12) United States Patent
Guo et al.

(10) Patent No.: US 12,435,510 B2
(45) Date of Patent: Oct. 7, 2025

(54) CEILING MOUNT ADAPTABLE TO VARIOUS CEILING RAIL WIDTHS

(71) Applicant: HEWLETT PACKARD ENTERPRISE DEVELOPMENT LP, Spring, TX (US)

(72) Inventors: Yuhai Guo, Beijing (CN); Aijun Liu, Beijing (CN); Yuying Chen, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 283 days.

(21) Appl. No.: 18/194,872

(22) Filed: Apr. 3, 2023

(65) Prior Publication Data
US 2024/0328155 A1 Oct. 3, 2024

(51) Int. Cl.
*E04B 9/00* (2006.01)
*E04B 9/06* (2006.01)

(52) U.S. Cl.
CPC .............. *E04B 9/006* (2013.01); *E04B 9/068* (2013.01)

(58) Field of Classification Search
None
See application file for complete search history.

(56) References Cited

U.S. PATENT DOCUMENTS

| | | | | |
|---|---|---|---|---|
| 7,537,190 B2 * | 5/2009 | Fan | ...................... | H04B 1/3877 379/426 |
| 7,967,269 B2 * | 6/2011 | Liu | ........................ | F16M 13/02 248/316.4 |
| 8,567,737 B2 * | 10/2013 | Chen | ..................... | H04B 1/3877 379/454 |
| 9,303,811 B1 | 4/2016 | Lutz, Jr. et al. | | |
| 9,749,002 B1 * | 8/2017 | Fan | .......................... | H04M 1/04 |
| 10,161,565 B2 * | 12/2018 | Wu | ............................ | F16F 1/12 |
| 10,871,259 B2 | 12/2020 | Nguyen | | |
| 2005/0176278 A1 | 8/2005 | Cheatham et al. | | |
| 2009/0294617 A1 * | 12/2009 | Stacey | ..................... | H04M 1/04 248/316.1 |
| 2012/0312936 A1 * | 12/2012 | Huang | ................. | F16M 11/041 248/316.1 |
| 2013/0240587 A1 * | 9/2013 | Buchhalter | ......... | B60R 11/0241 224/570 |
| 2014/0117186 A1 * | 5/2014 | Govindasamy | ........ | F16M 11/16 248/317 |
| 2018/0177660 A1 | 6/2018 | Davies et al. | | |
| 2024/0328155 A1 * | 10/2024 | Guo | ........................ | E04B 9/006 |
| 2024/0360955 A1 * | 10/2024 | Liu | ........................ | F16M 11/16 |

* cited by examiner

*Primary Examiner* — Steven M Marsh
(74) *Attorney, Agent, or Firm* — Jones Robb PLLC (57) ABSTRACT

A ceiling mount comprises a mounting plate to be coupled to an electronic device and two clips to be mounted to a ceiling rail. The clips comprise engagement members to engage with opposite sides of the ceiling rail, respectively, and support arms movably coupling the engagement members to the mounting plate. One of the support arms of each clip comprises linear gear teeth. The ceiling mount also comprises a circular gear coupled to the mounting plate and engaged with the respective linear gear teeth of the clips, and a pawl engaged with the circular gear and movable between a first state and a second state. In the first state of the pawl, the engagement members can be moved toward one another and are prevented from being moved away from one another, and in the second state of the pawl, the engagement members can be moved away from one another.

19 Claims, 8 Drawing Sheets

CEILING MOUNT ADAPTABLE TO VARIOUS CEILING RAIL WIDTHS

INTRODUCTION

Electronic devices, such as wireless Access Points (APs), are sometimes mounted to the ceiling of a building. In particular, the electronic devices may be mounted to ceiling rails, such as the ceiling rails that make up a dropped ceiling (a dropped ceiling comprises ceiling tiles supported by a grid of rails hung below a main structural ceiling). Mounting wireless APs and other electronic devices to ceiling rails is particularly common, for example, in large scale network deployments, such as those found at a college campus or office building. The electronic devices may be mounted to a ceiling rail via a device called a ceiling mount, which has one side that is mounted to the rail and an opposite side coupled to the electronic device. The ceiling mount may be a separate device that is removably coupled to the electronic device, or the ceiling mount may be a part of (e.g., permanently coupled to) the electronic device.

BRIEF DESCRIPTION OF THE DRAWINGS

The present disclosure can be understood from the following detailed description, either alone or together with the accompanying drawings. The drawings and related description of the figures are included to provide a further understanding of the present disclosure and are incorporated in and constitute a part of this specification. The drawings illustrate one or more nonlimiting aspects and implementations of the present teachings and together with the description explain certain principles and operation. In the drawings.

DETAILED DESCRIPTION

Ceiling rails come in a variety of sizes and shapes. In particular, some ceiling rails comprise a pair of horizontal flanges (e.g., at the bottom of the rail), and a ceiling mount for an electronic device may be mounted to the rail by engaging with these flanges. However, different types of ceiling rails have a variety of different widths. Because of this variation in width, different types of ceiling mounts may be needed for different types of ceiling rails. Thus, a manufacturer of electronic devices may need to produce multiple different ceiling mounts to enable their electronic devices to be mounted to any of the various types of ceiling rails commonly in use. This can result in increased costs, as more time may need to be spent designing all the different ceiling mounts and multiple sets of tooling may be needed to produce the different ceiling mounts. In addition, the different types of ceiling mounts may need to have different stock-keeping units (SKUs), which can increase logistical complexity and further drive-up costs. Moreover, selecting one of these multiple ceiling mounts can be confusing for the customer, as the customer may not know which type of ceiling rail they have and/or which one of the many ceiling mount options they need. Alternatively, if a manufacturer desires to automatically provide ceiling mounts along with each electronic device that is sold so that the user does not need to select a ceiling mount, the manufacturer may need to provide many ceiling mounts with each electronic device in order to ensure compatibility with all of the commonly used types of rails, which further drives up costs and creates waste in the form of the provided ceiling mounts that the user does not use.

In addition, some ceiling mounts can be somewhat difficult to install or uninstall. In particular, many ceiling mounts comprise mounting mechanisms that need to be actuated during mounting or unmounting by fine manual motions, such as loosening/tightening a screw (whether using a tool or by hand), while the ceiling mount is positioned at the ceiling rail. While the actuation of such mounting mechanisms may be relatively easy in some contexts, when performed in the context of installing a ceiling mount on a ceiling rail, these actions can be relatively difficult. During installation, a person installing the ceiling mount (referred to herein as a user for simplicity) usually stands on a ladder and reaches above their head, and in this state the user may only have one free hand to use for actuating the attachment mechanism, as the other hand may be occupied (e.g., holding the electronic device to be mounted, holding tools, holding onto the ladder, etc.). Also, when the ceiling mount is positioned adjacent the ceiling rail for mounting or unmounting, the mounting mechanisms of the ceiling mount might not be accessible from a convenient direction or visible to the user, for example because the electronic device coupled to the ceiling mount might block the most direct approach to accessing or seeing the mounting mechanism. Thus, the otherwise simple tasks associated with actuating an attachment mechanism can be much more difficult to perform in the context of mounting/unmounting the ceiling mount to the ceiling rail.

To address these and other issues, examples disclosed herein comprise ceiling mounts that can be relatively easily mounted to (and unmounted from) a variety of different ceiling rails having different widths. In other words, the ceiling rails are adaptable for compatibility with a variety of ceiling rail widths. In some examples, a ceiling mount comprises a pair of clips that engage with the flanges of the ceiling rail, and the clips are movable towards or away from one another so as to change a separation distance between the clips (more specifically, a separation distance between engagement members of the clips is changed, wherein the engagement members are the portions of the clips that engage with the ceiling rail). The separation distance of the clips can be varied through a range of distances, which includes the respective widths of many different types of ceiling rails. This allows the clips to be adapted for mounting to multiple different types of ceiling rails having different widths. Thus, a single ceiling mount can replace multiple different ceiling mounts, thereby reducing the costs, complexity, and other difficulties noted above associated with needing to have multiple different ceiling mounts.

In addition, example ceiling mounts disclosed herein may be relatively easy to install. In some examples, the attachment mechanism of the ceiling mounts disclosed herein is actuated by manually applying forces to move engagement members of the clips towards one another (e.g., squeezing the engagement members together) until they engage with the ceiling rail, whereupon the attachment mechanism automatically locks the clips into this engaged position. This action of moving the engagement members together can be performed relatively easily. In particular, the engagement members are relatively large (as compared to screws or other common attachment mechanisms) and moving them does not require high manual dexterity, high precision, or fine motor control from the user (such as may be required for turning screws, for example). Thus, the engagement members can be relatively easily moved together even while using just one hand, while standing on a ladder, while reaching above one's head, and/or without having direct vision of the engagement member. Thus, it can be much easier to mount the ceiling mounts disclosed herein to the ceiling rail than it can be to mount other types of ceiling mounts.

As noted above, in some examples, the clips can be moved to change the separation distance between their engagement members to accommodate different rail widths, and also the engagement members can be automatically locked into place when engaged with the ceiling rail. These functions are facilitated, in part, by a circular gear and a pawl engaged with the gear, with the pawl being movable between a first state that allows rotation of the gear in a first direction while preventing rotation in a second direction, and a second state that allows rotation of the gear in the second direction while preventing rotation in the first direction. The clips have linear gear teeth engaged with opposite sides of the circular gear. Thus, when the pawl is in the first state the engagement members of the clips can move towards one another but not away from one another, and when the pawl is in the second state the engagement members of the clips can move away from one another but not towards one another. This allows for very simple installation of the ceiling mount onto different widths of ceiling rails. For example, the pawl may initially be placed in the second state (which allows for movement of the engagement members away from one another) and the engagement members of the clips may be moved away from one another until their separation distance exceeds the width of the ceiling rail onto which the ceiling mount is to be mounted. Subsequently, the pawl may be moved to the first state (which allows movement of the engagement members together), and the ceiling mount may be positioned adjacent to the ceiling rail. The engagement members may then be moved together, with the pawl still in the first state, until they engage with the ceiling rail. Because the pawl is in the first state when the engagement members engage the ceiling rail, the engagement members are prevented (by the circular gear and pawl) from moving away from one another and disengaging from the ceiling rail. Thus, the ceiling mount is automatically secured on the ceiling rail as a consequence of the engagement members being engaged with the ceiling rail, without the user needing to perform any other actions to secure the ceiling mount to the rail. In some examples, the ceiling mount does not need to be adjacent to the ceiling rail during the actions of spreading the clips apart to their initial separation distance and/or actuating the pawl between the first and second states, and therefore the user can perform these actions in a convenient context (e.g., while on the ground, without their arms extended above their head, while having two hands available, and/or prior to attaching the electronic device to the ceiling mount). The ability to perform these actions away from the ceiling rail can make these actions very simple to perform. Moreover, in some examples, the only action that needs to be performed while the ceiling mount is adjacent to the ceiling rail is the action of squeezing the clips together, which can be a relatively easy action to perform as already described above. Thus, the overall process of installing the ceiling mount can be relatively simple.

Similarly, the process of uninstalling the ceiling mount can be relatively simple. To release the ceiling mount from the ceiling rail, the pawl can be actuated from the first state to the second state. This allows the engagement members to be moved away from one another and thus to be disengaged from the rail. In some examples, the action of actuating the pawl between the first and second states can be relatively simple. For example, in some implementations the pawl can be actuated between states by simply pressing against an end of the pawl, which protrudes from a side of the ceiling mount, to pivot the pawl (much like actuating a light switch). This actuation of the pawl can be performed relatively simply (e.g., using a single finger) and does not require very fine motion or vision of the pawl to perform.

Turning now to the figures, various devices, systems, and methods in accordance with nonlimiting aspects of the present disclosure will be described.

Figure 1:
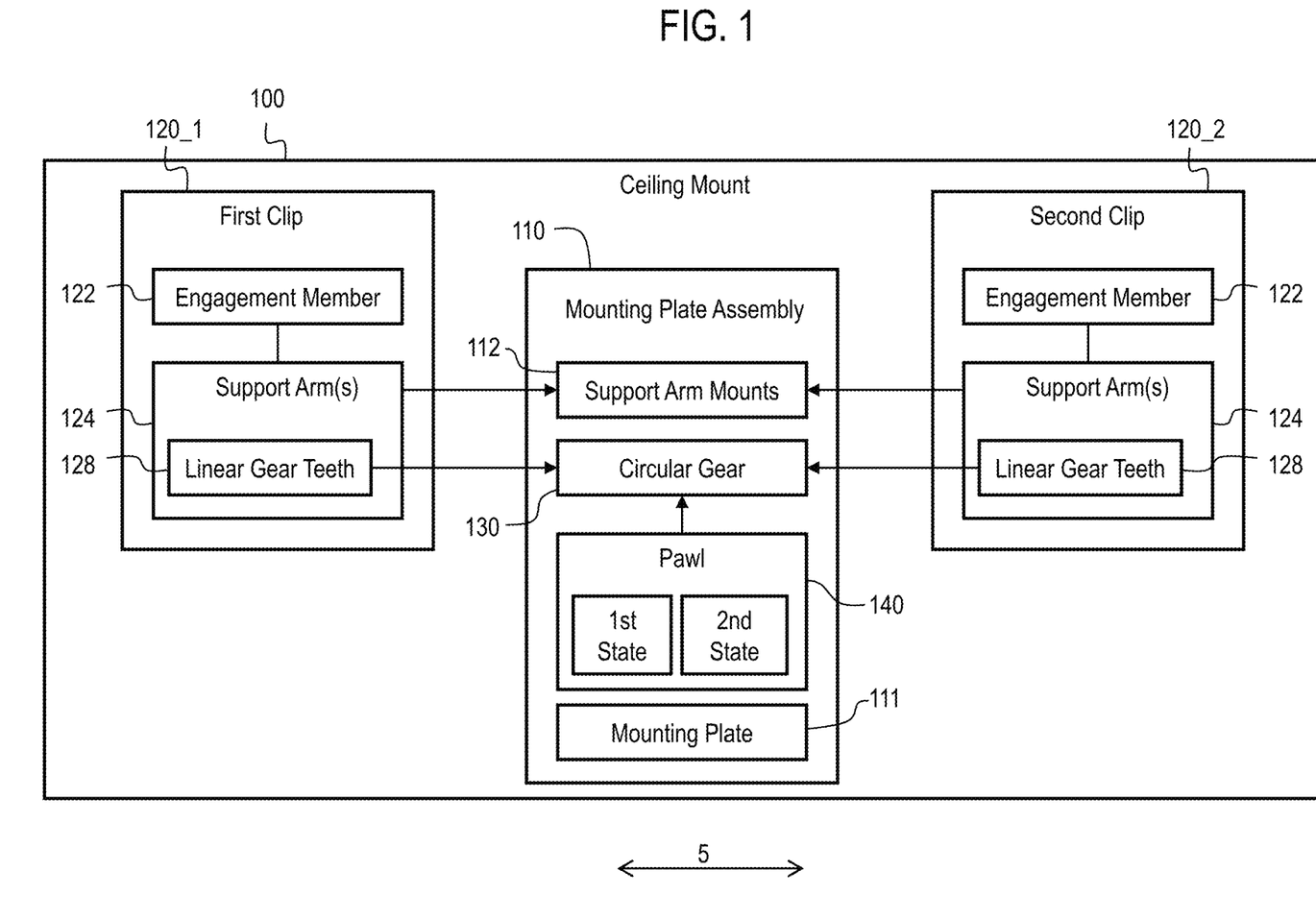
FIG. 1 is a block diagram illustrating a ceiling mount.
Figure 2:
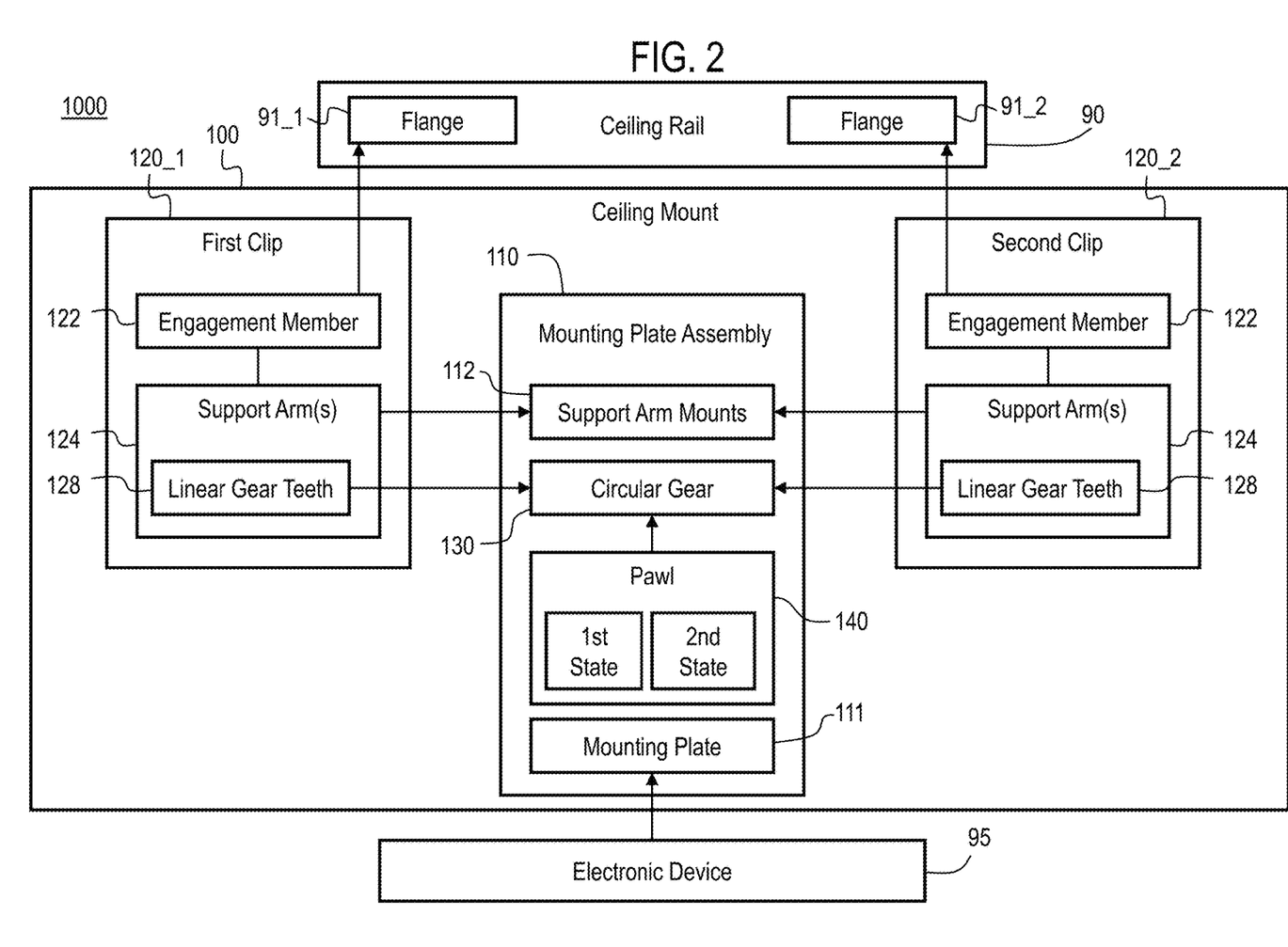
FIG. 2 is a block diagram illustrating a system comprising the ceiling mount of FIG. 1 and an electronic device.

FIG. 1 is a block diagram conceptually illustrating a ceiling mount 100 for mounting an electronic device to a ceiling rail. FIG. 2 is a block diagram conceptually illustrating a system 1000 comprising the ceiling mount 100 of FIG. 1. The system 1000 is one example of a system in which the ceiling mount 100 may be utilized, but the ceiling mount 100 can be provided separately from the other components of the system 1000 and can be used in other systems. It should be understood that FIGS. 1 and 2 are not intended to illustrate specific shapes, dimensions, or other structural details accurately or to scale, and that implementations of the ceiling mount 100 and system 1000 may have different numbers and arrangements of the illustrated components and may also include other parts that are not illustrated.

As shown in FIGS. 1 and 2, the ceiling mount 100 comprises a mounting plate assembly 110 and two clips 120 coupled to the mounting plate assembly 110, specifically a first clip 120_1 and a second clip 120_2. The mounting plate assembly 110 comprises a mounting plate 111, support arm mounts 112, a circular gear 130, and a pawl 140. Each of the clips 120 comprises an engagement member 122 and one or more support arms 124, with one of the support arms 124 of each clip 120 comprising linear gear teeth 128. These components are described in greater detail below.

The mounting plate 111 structurally supports the other components of the ceiling mount 100, such as the circular gear 130, pawl 140, and support arm mounts 112. The mounting plate 111 is coupled to the clips 120, as will be described in greater detail below. In addition, the mounting plate 111 is configured to be coupled to an electronic device, and when so coupled the mounting plate 111 acts as an intermediary that links the clips 120 to the electronic device. For example, in the system 1000 of FIG. 2, an electronic device 95 is coupled to the mounting plate 111, as indicated by the arrow connecting the two. In some examples, the mounting plate 111 is distinct from and removably couplable to the electronic device 95, for example via removable fasteners (e.g., screws), snap fittings, or any other removable attachment technique. In other examples, the mounting plate 111 may be permanently coupled to the electronic device 95. For example, in some implementations the mounting plate 111 may be an integral part of or may be permanently attached to a chassis of the electronic device 95, for example by welding, friction or press fitting, permanent fasteners (e.g., rivets) or any other permanent attachment technique.

As noted above, the clips 120 are coupled to the mounting plate 111. Specifically, each of the clips 120 comprises one or more support arms 124 that are coupled to the mounting plate 111 by engaging with corresponding support arm mounts 112 coupled to the mounting plate 111, as indicated by arrows in FIGS. 1 and 2. The mounting plate assembly 110 comprises at least one support arm mount 112 for each support arm 124. Thus, for example, in implementations in which the clips 120 each comprise two support arms 124, at least four support arm mounts 112 are coupled to the mounting plate 111 (i.e., at least one support arm mount 112 per support arm 124). The support arms 124 are engaged with the support arm mounts 112 so as to movably couple the clips 120 to the mounting plate 111. In particular, the engagement between the support arm mounts 112 and the support arms 124 allows the support arms 124 to translate relative to the mounting plate 111 along directions parallel to a first axis 5. In some examples, the support arms 124 each extend parallel to this first axis 5. In some examples, the support arm mounts 112 may constrain the motion of the support arms 124 to just the aforementioned translation along the first axis 5, i.e., the support arms 124 may have a single degree of freedom of motion. In some examples, multiple support arms 124 are provided per clip 120 to increase the strength and rigidity of the clips 120 themselves as well as the strength of the connection between the clips 120 and the mounting plate 111. In addition, multiple support arms 124 per clip 120 can also help to reduce the likelihood of the support arms 124 binding during motion. However, in some examples, a single support arm 124 may be provided per clip 120.

In some examples, the support arm mounts 112 may comprise brackets, channels, tracks, grooves, clips, loops, or other guide structures that engage with the support arms 124 to movably couple the support arms 124 to the mounting plate 111. For example, in some implementations, a support arm mount 112 may comprise a bracket with an L-shaped cross section, with a first portion of the bracket extending perpendicularly from the mounting plate 111 and a second portion extending perpendicularly from the first portion and parallel to the mounting plate 111, wherein the bracket defines a space into which one of the support arms 124 can be received with the support arm 124 being positioned between the mounting plate 111 and the second portion of the bracket. In some examples, the support arm mounts 112 may be integrally coupled to the mounting plate 111. For example, in some implementations the support arm mounts 112 and mounting plate 111 may be machined from the same base material (e.g., a metal plate), for example, by stamping, cutting, and/or bending portions of the base material that will become the support arm mounts 112 relative to the remainder of the base material that will become the mounting plate 111. In other implementations, the support arm mounts 112 may initially be separate from the mounting plate 111 and may be coupled to the mounting plate 111 during manufacture, such as by welding, brazing, mechanical fasteners, or any other fastening technique.

The engagement members 122 of the clips 120 are configured to engage with a ceiling rail to mount the ceiling mount 100 to the ceiling rail. For example, in the implementation of FIG. 2 the engagement members 122 are configured to engage with flanges 91 (e.g., a first flange 91_1 and a second flange 91_2) of a ceiling rail 90, as indicated in FIG. 2 by the arrows extending between the engagement members 122 and the flanges 91. The flanges 91 may protrude horizontally in opposite directions from a center portion of the rail 90, and in some examples are positioned at a bottom of the rail 90. For example, the rail 90 may have a T-shaped cross-section (e.g., with the T oriented upside down). As another example, the rail 90 may have an I-shaped cross-section. Other cross-sectional shapes of the ceiling rail 90 are also possible, as would be familiar to those of ordinary skill in the art.

The engagement members 122 are also coupled to the support arms 124 of the clips 120. Thus, the engagement members 122 are coupled to the mounting plate assembly 110 via the support arms 124. Accordingly, when the electronic device 95 is coupled to the mounting plate 111 and the engagement members 122 are engaged with the ceiling rail 90, as is shown in FIG. 2, the electronic device 95 is coupled to the ceiling rail 90 via the mounting plate 111, the support arms 124, and the engagement members 122. This state may be referred to as the electronic device 95 being mounted to the ceiling rail 90. Note that in some examples the ceiling mount 100 may be coupled to the ceiling rail 90 prior to being coupled to the electronic device 95, while in other examples the ceiling mount 100 may be coupled to the electronic device 95 prior to being coupled to the ceiling rail 90.

Moreover, because the support arms 124 can translate relative to the mounting plate 111 and the engagement members 122 are coupled to the support arms 124, the engagement members 122 translate along with the support arms 124 relative to the mounting plate 111. In other words, the entire clip 120 can translate relative to the mounting plate 111. In particular, in some examples the respective engagement members 122 of the clips 120 may be disposed facing one another on opposite sides of a center of the mounting plate 111 and the clips 120 can be moved relative to the mounting plate 111 along the first axis 5 such that the respective engagement members 122 thereof move towards one another (decreasing the separation distance between the engagement members 122) or away from one another (increasing the separation distance between the engagement members 122). This can allow the engagement members 122 to be engaged, respectively, with opposite sides of a ceiling rail (e.g., at flanges of the ceiling rail) by first separating the engagement members 122 more than a width of the ceiling rail, next positioning the ceiling rail between the engagement members 122, and finally moving the engagement members 122 towards one another until they engage the opposite sides of the ceiling rail. More specifically, in the implementation of FIG. 2 the engagement member 122 of the first clip 120_1 is configured to engage with a first flange 91_1 on one side of the rail 90 while the engagement member 122 of the second clip 120_2 is configured to engage with a second flange 91_2 on an opposite side of the rail 90. The ability to change the separation distance between the engagement members 122 can allow the ceiling mount 100 to be mounted to ceiling rails having a variety of different widths. (In this context, width refers to the dimension of the rail perpendicular to a longitudinal dimension of the rail and perpendicular to a height dimension of the rail, or in other words the dimension along which the flanges protrude from the center of the rail.) In some examples, the separation distance between the engagement members 122 can be continuously varied through a range of distances that includes multiple different widths of multiple different types of ceiling rails.

In some implementations, each engagement member 122 may comprise a bracket that defines a space into which a flange 91 of the ceiling rail 90 is received when the engagement member 122 is engaged with the flange 91. More specifically, a bracket of the engagement member 122 may comprise at least a first portion that is generally parallel to the first axis 5 and also generally parallel to the width dimension of the flange 91 when engaged therewith, and a second portion that extends transversely from the first portion. One end of the second portion is coupled to the first portion and the opposite end is coupled (directly or indirectly) to the support arms 124. Thus, the first portion is spaced apart from the support arms 124 and the flange 91 may be received between the first portion and the support arm 124 when engaged with the engagement member 122. For example, the bracket of the engagement member 122 may have an L-shaped cross-section, with the first portion extending parallel to the first axis 5 and the second portion extending perpendicularly from the first portion to the support arms 124. In such examples, when the flange 91 is engaged with the engagement member 122, the flange 91 is received within a volume defined between the support arms 124 and the first portion of the engagement member 122. As another example, the bracket of the engagement members 122 may have a U-shaped cross-section, with the first portion and second portion arranged similarly as described above with respect to the L-shaped example and with a third portion parallel to and facing the first portion. In such examples, when the flange 91 is engaged with the engagement member 122, the flange 91 is received within a volume defined between the first and third portions of the engagement member 122.

For each of the clips 120, one of the support arms 124 thereof further comprises linear gear teeth 128. References to the support arm 124 comprising linear gear teeth 128 may include the linear gear teeth 128 being an integral part of the support arm 124 or the linear gear teeth 128 being formed from an initially separate part that is then coupled to the support arm 124 (e.g., via welding, brazing, adhesives, mechanical fasteners, or other fastening techniques). These linear gear teeth 128 are engaged (meshed) with gear teeth of the circular gear 130, which is rotatably coupled to the mounting plate 111, such that translation of the support arms 124 relative to the plate 111 causes rotation of the circular gear 130 and vice versa. In other words, the linear gear teeth 128 and the circular gear 130 are in a rack-and-pinion arrangement wherein translation of the support arms 124 is dependent on (conditional on) the rotation of the circular gear 130, and vice versa. More specifically, the support arms 124 can translate only if the circular gear 130 is rotating, and moreover the direction in which the support arms 124 can translate is dependent on the direction in which the circular gear 130 rotates, and vice versa. In addition, the linear gear teeth 128 of the first clip 120_1 are engaged to one side of the circular gear 130 and the linear gear teeth 128 of the second clip 120_2 are engaged to the opposite side of the circular gear 130, and therefore the motion of the first clip 120_1 and the second clip 120_2 is constrained by the circular gear 130 to permit only concurrent motion in opposite directions as one another. Specifically, the respective engagement members 122 of the clips 120 can move towards one another (i.e., towards the center of the mounting plate 111), which causes the circular gear 130 to rotate in a first direction, or the engagement members 122 can move away from one another (i.e., away from the center of the mounting plate 111), which causes the circular gear 130 to rotate in a second direction (opposite the first direction). The circular gear 130 can also transfer forces applied to one clip 120 to the other clip 120. For example, if a user were to apply forces to one clip 120 to move it in one direction, then the other clip 120 would also move concurrently in the opposite direction because of the circular gear 130. In addition, if the circular gear 130 is prevented from rotating in the first direction, then the respective engagement members 122 of the clips 120 are prevented from moving towards one another. Conversely, if the circular gear 130 is prevented from rotating in the second direction, then the respective engagement members 122 of the clips 120 are prevented from moving away from one another.

In addition, the pawl 140 is engageable with the circular gear 130. The pawl 140 is pivotably coupled to the mounting plate 111 and can be pivoted between a first state and a second state. In the first state, the pawl 140 engages the circular gear 130 in a manner that allows the circular gear 130 to rotate in a first direction while preventing the circular gear 130 from rotating in a second direction. Accordingly, with the pawl 140 in the first state, the engagement members 122 can be moved towards one another but cannot be moved away from one another. In the second state, the pawl 140 allows the circular gear 130 to rotate in the second direction. Accordingly, with the pawl 140 in the second state, the engagement members 122 can be moved away from one another. In some examples, the pawl 140 is disengaged from the circular gear 130 in the second state, and thus rotation of the circular gear 130 in the first direction is also allowed in the second state. In other examples, the pawl 140 is engaged with the circular gear 130 in the second state and prevents the circular gear 130 from rotating in the first direction. In some examples, the pawl 140 comprises a first end that is engageable with the circular gear 130 and a second end, opposite from the first end, wherein the pawl 140 can be actuated between the first and second states by application of force to the second end thereof to pivot the pawl 140. In some examples, the second end of the pawl 140 protrudes laterally beyond the other components of the ceiling mount 100, which can make it relatively easy for a user to access the second end of the pawl 140 and actuate the pawl 140, even when the ceiling mount 100 is mounted to the ceiling rail 90.

As noted above, in some examples, the engagement members 122 of the clips 120 can change their separation distance to accommodate different rail widths. In particular, during a mounting process, the pawl 140 may initially be placed in the second state and the engagement members 122 may be moved away from one another until their separation distance exceeds the width of the ceiling rail 90 (i.e., the combined widths of the flanges 91_1 and 91_2). Next, the pawl 140 may be moved to the first state that allows movement of the engagement members 122 together while preventing movement of the engagement members 122 away from one another. Finally, the ceiling mount 100 may be positioned with the ceiling rail 90 between the engagement members 122 (specifically, with the flanges 91 aligned with the engagement members 122), and the engagement members 122 may be moved together until they engage with the flanges 91 of the ceiling rail 90. Because the pawl 140 is in the first state when the engagement members 122 engage the flanges 91, the engagement members 122 are prevented from moving away from one another. Therefore, once the engagement members 122 have engaged the flanges 91, the ceiling mount 100 is automatically securely affixed to the ceiling rail 90 without the user needing to take any additional actions to secure the mount 100, such as tightening screws or actuating other latching mechanisms. In some examples, the ceiling mount 100 does not need to be adjacent to the ceiling rail 90 during the spreading of the engagement members 122 to their initial separation distance and/or the actuation of the pawl 140 between the first and second states, and therefore a user can perform these actions while on the ground, without their arms extended above their head, while having two hands available, and/or prior to attaching the electronic device 95 to the ceiling mount 100. The ability to perform these actions away from the ceiling rail 90 can make these actions very simple to perform. Moreover, although the action of squeezing the engagement members 122 together onto the flanges 91 does need to be performed near the ceiling rail 90, this action does not involve precise or fine motions and can be a relatively easy action to perform, as already described above. Thus, the process of installing the ceiling mount 100 can be relatively simple.

Similarly, the process of uninstalling the ceiling mount 100 can be relatively simple. To release the ceiling mount 100 from the ceiling rail 90, the pawl 140 can be actuated from the first state to the second state. This allows the engagement members 122 to be moved away from one another and thus to be disengaged from the rail 90. In some examples, the action of actuating the pawl 140 between the first and second states can be relatively simple. In some implementations the pawl 140 can be actuated between states by simply pressing against the second end of the pawl 140, which can be performed relatively simply (e.g., using a single finger) and does not require very fine motion or vision of the pawl 140 to perform.

The electronic device 95 illustrated in FIG. 2 may be, for example, a networking device, internet-of-things (IoT) device, compute device, or any other electronic device. Examples of networking devices that may be used as the electronic device 95 include wireless access points, routers, repeaters, hubs, network switches, or other networking devices. Examples of IoT devices that may be used as the electronic device 95 include cameras, sensors (e.g., temperature sensor, humidity sensors, etc.), controllers, or other IoT devices. Examples of compute devices that may be used as the electronic device 95 include edge-compute systems, servers, or any compute device comprising processing circuitry (e.g., a processor and/or dedicated hardware such as an Application Specific Integrated Circuit (ASIC), a Field Programmable Gate Array (FPGA), a Complex Programmable Logic Device (CPLD), etc.). In some examples, the electronic device 95 is configured to be removably coupled to the mounting plate 111. In some examples, the mounting plate 111 is a part of the electronic device 95.

Turning now to FIGS. 3-11, a ceiling mount 200 in accordance with various aspects of the disclosure will be described. The ceiling mount 200 is one configuration of the ceiling mount 100, and thus some components of the ceiling mount 200 are similar to (e.g., specific configurations of) components of the ceiling mount 100 described above. Similar components are referred to using the same last two digits, such as 220 and 120. The descriptions of components of the ceiling mount 100 are applicable to the similar components of the ceiling mount 200, and thus duplicative description of various aspects already described above may be omitted below. Although the ceiling mount 200 is one configuration of the ceiling mount 100, the ceiling mount 100 and the components thereof are not limited to the ceiling mount 200 and the components thereof.

Various elements of the ceiling mount 200 or components thereof are illustrated in multiple figures. As elements are described below, one or a few figures which are thought to be particularly pertinent to the element being described will be noted, and thus the description below will not necessarily describe FIGS. 3-11 separately and in strict sequence but will instead move back and forth between various figures. In addition, it should be understood that when certain figures are referred to in relation to a particular element, figures other than those that are identified may also illustrate the same part from other perspectives.

As shown in FIG. 3-7, the ceiling mount 200 includes a mounting plate assembly 210 and two clips 220 coupled to the mounting plate assembly 210, specifically a first clip 220_1 and a second clip 220_2. The mounting plate assembly 210 comprises a mounting plate 211, four support arm mounts 212 (i.e., support arm mounts 212_1, 212_2, 212_3, and 212_4), a circular gear 230, and a pawl 240. Each of the clips 220 comprises an engagement member 222 and two support arms 224. Specifically, the first clip 220_1 comprises support arms 224_1 and 224_3, while the second clip 220_2 comprises support arms 224_2 and 224_4. One of the support arms 224 of each clip 220 comprises linear gear teeth 228. These components are described in greater detail below.

Figure 3:
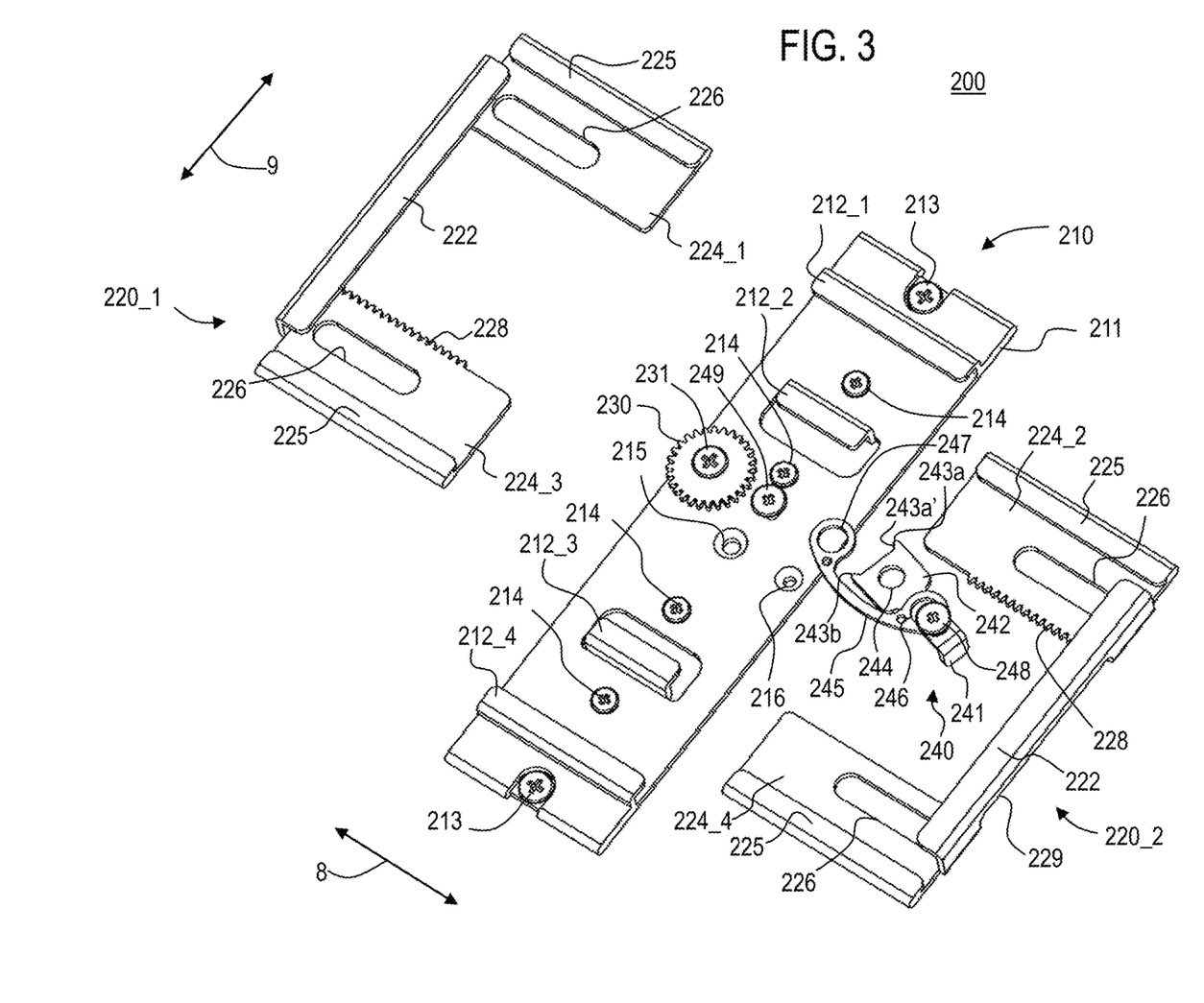
FIG. 3 is an exploded view of another ceiling mount, which is one example configuration of the ceiling mount of FIG. 1.
Figures 4, 5:
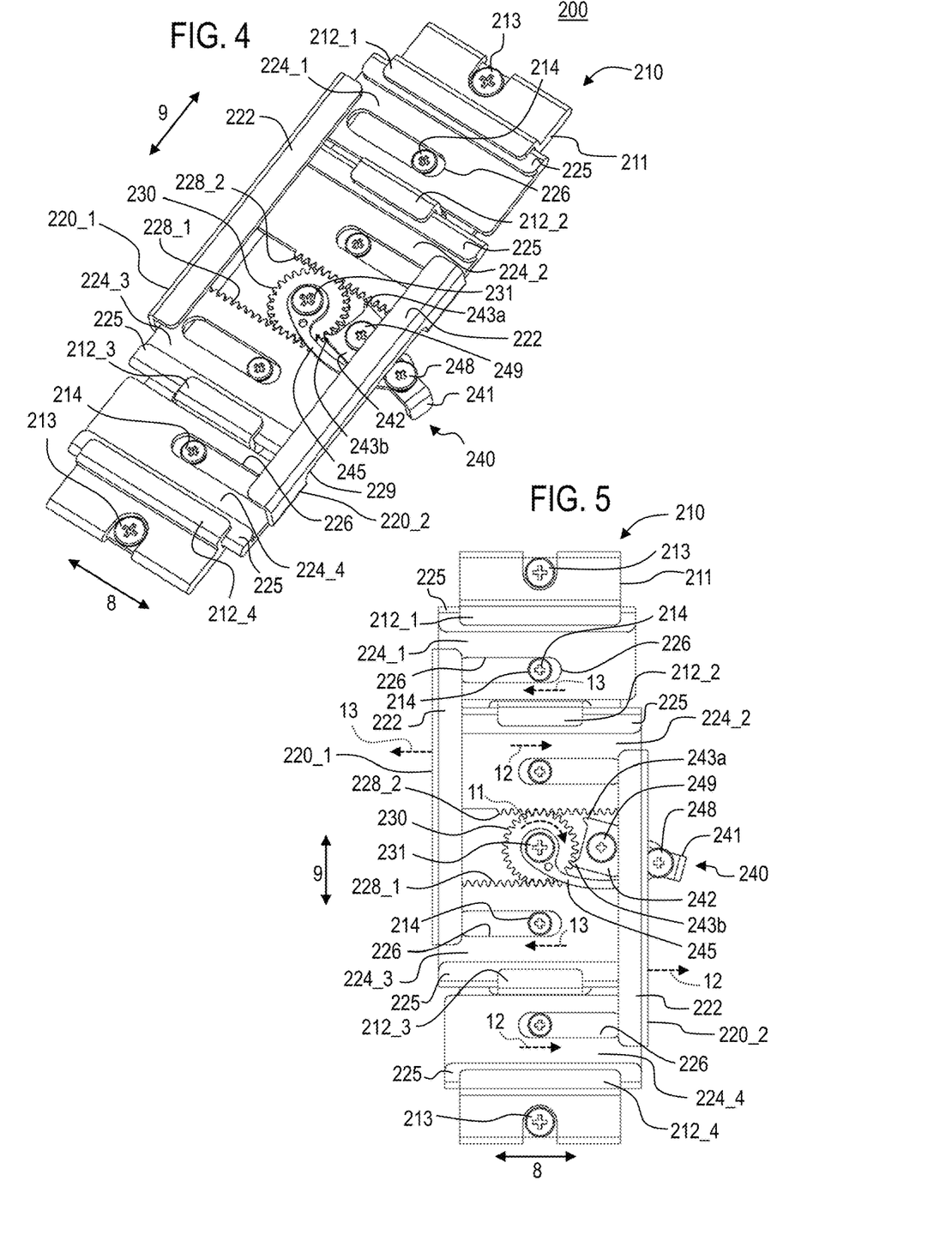
FIG. 4 is a perspective view of the ceiling mount of FIG. 3 in a first state.
FIG. 5 is a plan view of the second ceiling mount of FIG. 3 in the first state.

The mounting plate 211 is removably couplable to an electronic device (not shown). In particular, as shown in FIGS. 3-5, the mounting plate assembly 210 comprises screws 213 that extend through mounting plate 211 and engage complementary screw holes or nuts (not shown) in the electronic device. In other examples, the screws 213 may extend from the electronic device and engage with complementary screw holes or nuts in the mounting plate 211. In FIGS. 3-11, only two screws 213 are illustrated, but in various implementations any number of such screws 213 could be provided to removably couple the mounting plate 211 to the electronic device.

The support arms 224 of the clips 220 are coupled to the engagement members 222 of the clips 220. In particular, as shown in FIG. 3, the support arms 224 extend parallel to a first axis 8, whereas the engagement members 222 extend along a second axis 9 perpendicular to the first axis 8. As shown in FIGS. 4 and 5, the support arms 224 are engaged with respectively corresponding support arm mounts 212 coupled to the mounting plate 211 so as to movably couple the clips 220 to the mounting plate 211. Specifically, the support arm 224_1 is engaged with the support arm mount 212_1, the support arm 224_2 is engaged with the support arm mount 212_2, the support arm 224_3 is engaged with the support arm mount 212_3, and the support arm 224_4 is engaged with the support arm mount 212_4.

As shown in FIG. 3, the support arm mounts 212 comprise brackets with an L-shaped cross-section, such that a portion of each support arm mount 212 extends parallel to and is spaced apart from the mounting plate 211 (or a plane parallel to the mounting plate 211), thus defining a space between the support arm mount 212 and the mounting plate 211 (or the plane parallel to the mounting plate 211) into which the support arms 224 can be received. Thus, as shown in FIGS. 4 and 5, when the support arms 224 are engaged with the support arm mounts 212, an edge portion 225 of each support arm 224 is received within the space defined between the corresponding support arm mount 212 and the mounting plate 211 (or between the support arm mount 212 and a plane parallel to the mounting plate 211). Thus, in this state, the mounting plate 211 abuts one face of the support arm 224 and the support arm mount 212 abuts an opposite face of the support arm 224, and thus the support arms 224 are held parallel to the mounting plate 211 (i.e., prevented from rotating about axes 8 or 9) and are prevented from translating in directions perpendicular to mounting plate 211 (i.e., prevented from translating perpendicular to a plane defined by the axes 8 and 9). In addition, the support arm mounts 212_1 and 212_3 face towards one another, and thus when the support arms 224_1 and 224_3 of the first clip 220_1 are engaged therewith, the support arm mounts 212_1 and 212_3 abut the clip 220_1 along opposite sides thereof and thus prevent motion of the first clip 220_1 along the axis 9 and prevent rotation of the clip 220_1 about an axes perpendicular to the axes 8 and 9. The same is true for the support arm mounts 212_2 and 212_4 and the support arms 224_2 and 224_4 of the second clip 220_2. Thus, the support arm mounts 212 substantially constrain the support arms 224 to allow translation relative to the mounting plate 211 parallel to the first axis 8, while substantially preventing motion in other directions. Thus, the clips 220_1 and 220_2 can move relative to the mounting plate 211 in the directions 12, 13, 15, and 16 shown in FIGS. 5 and 7. Of course, in any real-world implementation some amount of play or backlash may be present between the support arms 224 and support arm mounts 212 (e.g., due to manufacturing tolerances and/or to allow for easier sliding of the clips 220), and this may allow for limited rotation and/or translation of the clips 220 in other directions. Thus, references herein to constraining the motion of the clips 220 to only translation parallel to axis 8 should be understood as allowing for some play or backlash, specifically at least any play or backlash that is inconsequential, any play or backlash that would be typical for ceiling mount parts due to manufacturing or other tolerances, and/or any play or backlash within ±2 mm (for translations) or ±5 degrees (for rotations).

In the example illustrated in FIGS. 3-11, the support arm mounts 212 are integrally coupled to the mounting plate 211. For example, the support arm mounts 212 and mounting plate 211 may be machined from the same base material (e.g., a metal plate), for example, by stamping, cutting, and/or bending portions of the base material that will become the support arm mounts 212 relative to the remainder of the base material that will become the mounting plate 211. In other implementations, the support arm mounts 212 may initially be separate from the mounting plate 211 and may be coupled to the mounting plate 211 during manufacture, such as by welding, brazing, mechanical fasteners, or any other fastening technique.

As shown in FIGS. 3-5, the mounting arms 224 may also comprise guide slots 226. The mounting plate assembly 210 may also comprise stops 214 coupled to the mounting plate 211. These stops 214 are disposed within the guide slots 226 of the mounting arms 224 and coupled to the mounting plate 211 after the mounting arms 224 have been engaged with the mounting arm supports 212. The stops 214 and guide slots 226 further constrain the motion of the mounting arms 224, including preventing the mounting arms 224 from being moved beyond predetermined end points while being translated parallel to the axis 8. This can help to avoid the mounting arms 224 being inadvertently disengaged from the mounting arm supports 212 as a result of moving the clips 220 too far apart. In some examples, the stops 214 comprise screws that removably engage screw holes (not illustrated) in the mounting plate 211. In other examples, the stops 214 may be pegs, rivets, or any other structure that can be disposed within the guide slots 226 and coupled to the mounting plate 211.

Figure 10:
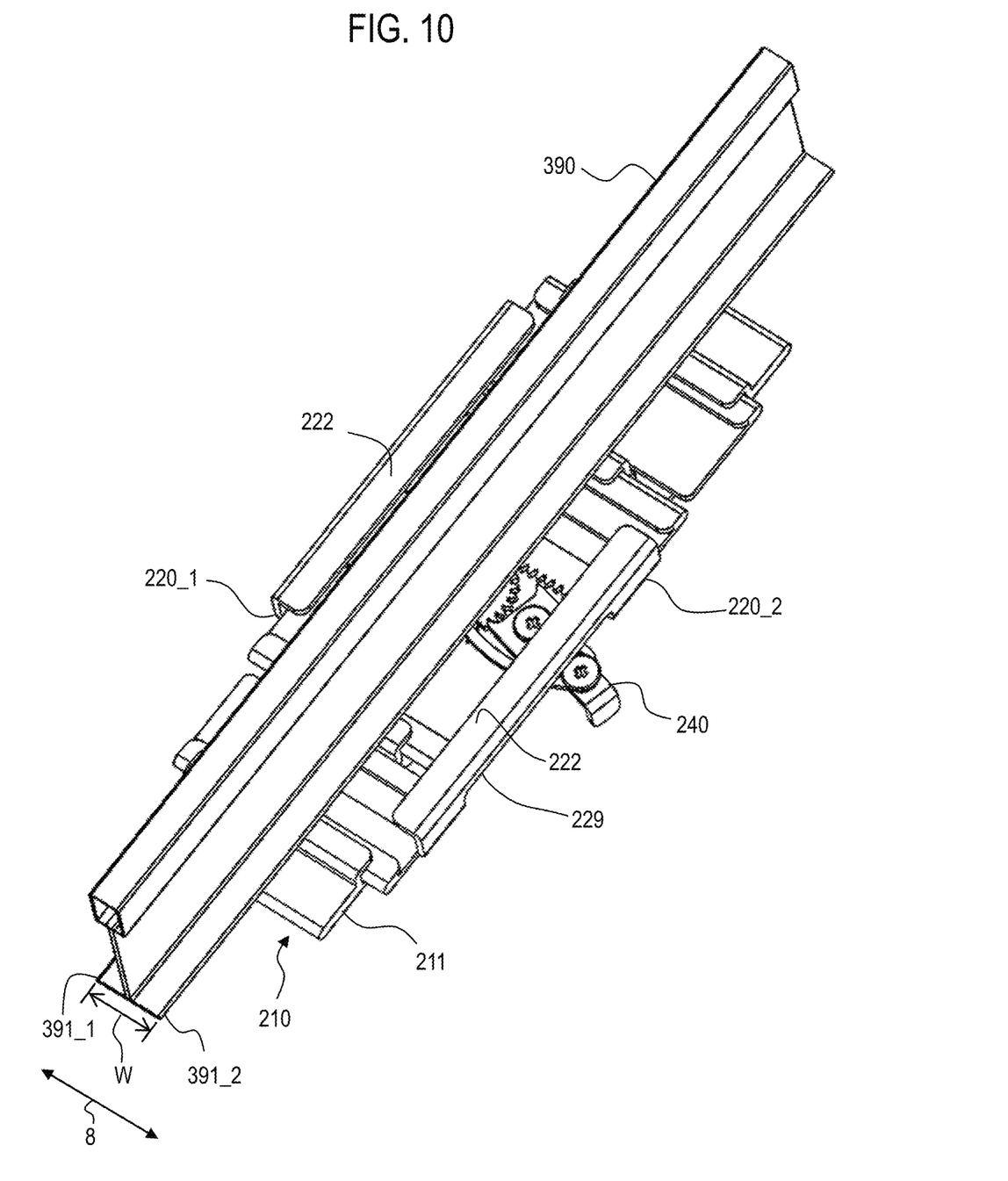
FIG. 10 is a perspective view of the ceiling mount of FIG. 3 in the first state and adjacent to a ceiling rail.
Figure 11:
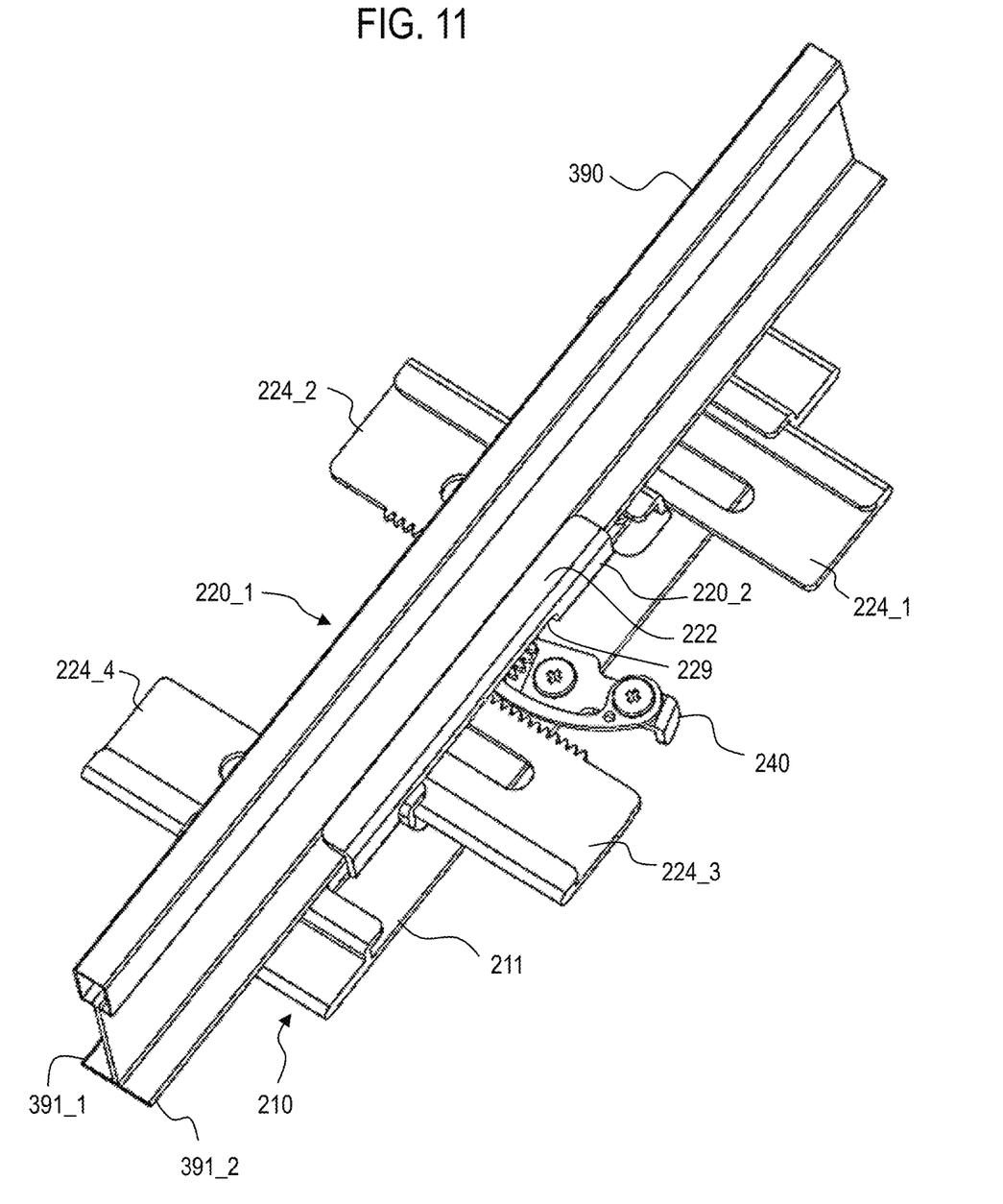
FIG. 11 is a perspective view of the ceiling mount of FIG. 3 in the third state and mounted to the ceiling rail.

The engagement members 222 of the clips 220 are configured to engage with a ceiling rail to mount the ceiling mount 200 to the ceiling rail. For example, as shown in FIGS. 10 and 11, the engagement members 222 can engage with flanges 391 of a ceiling rail 390. This engagement is accomplished by first separating the engagement members 222 more than a width W of the ceiling rail 390 and positioning the ceiling rail 390 between the engagement members 222, as shown in FIG. 10. Then, the engagement members 222 are moved towards one another until they engage the flanges 391 (e.g., flanges 391_1 and 391_2) on opposite sides of the ceiling rail 390, as shown in FIG. 11.

As shown in FIGS. 3 and 4, each engagement member 222 is a bracket with an L-shaped cross-section that defines a space into which a flange of the ceiling rail is received when the engagement member 222 is engaged with the flange. As shown in FIG. 11., when the flange 391 is engaged with the engagement member 222, the flange 391 is positioned between a portion of the engagement member 222 and the support arms 224.

Figures 8, 9:
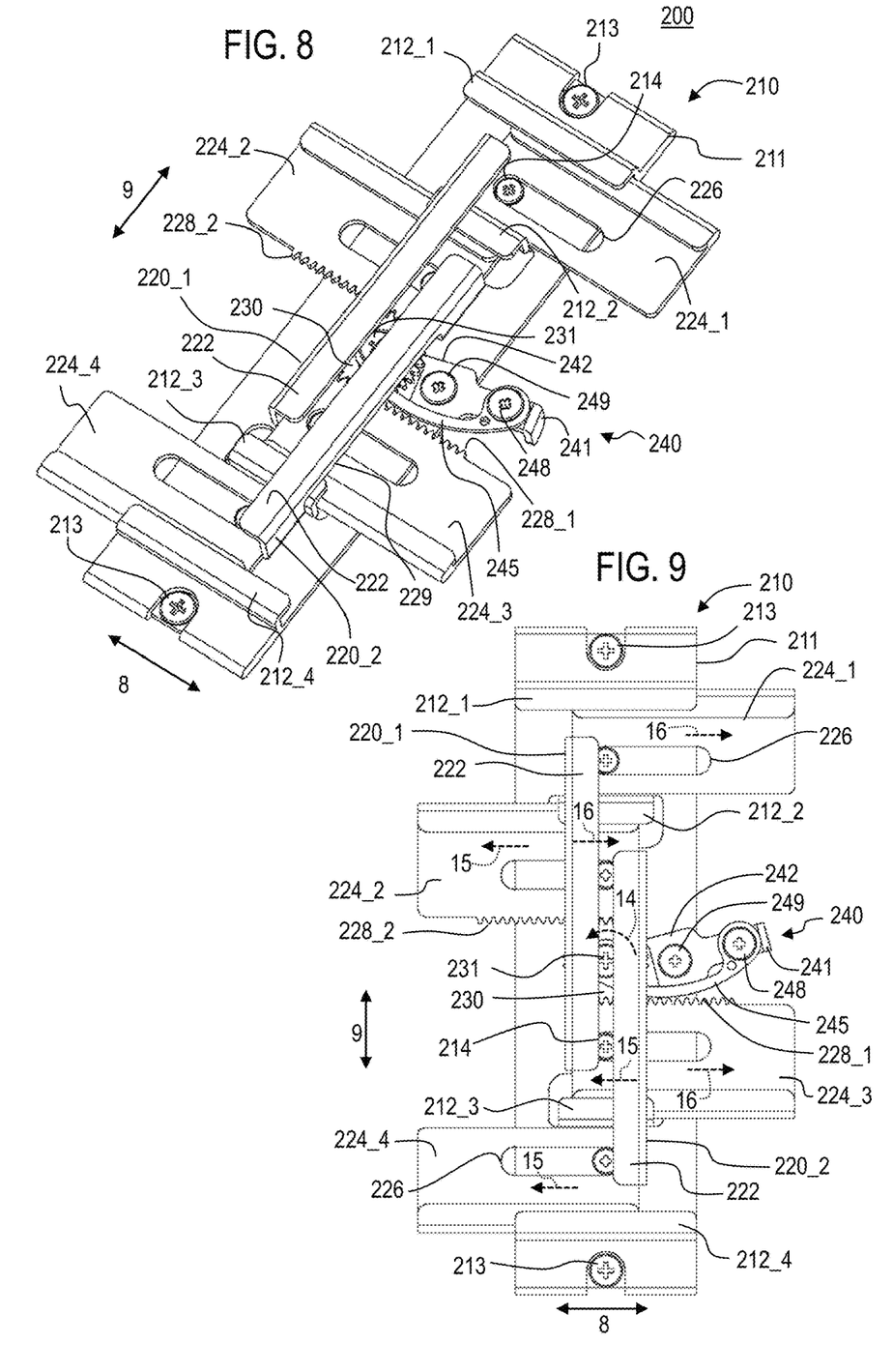
FIG. 8 is a perspective view of the ceiling mount of FIG. 3 in a third state.
FIG. 9 is a plan view of the ceiling mount of FIG. 3 in the third state.

As shown in FIGS. 3 and 4, the engagement members 222 may also comprise an opening 229 along a bottom edge thereof. This opening 229 may allow the free end 241 of the pawl 240 to protrude through and beyond the engagement member 222, as shown in FIGS. 3 and 4. Moreover, the support arms 224 of the one clip 220 may also protrude through the opening 229 in the engagement member 222 of the other clip 220 in certain positions of the clips 220, such as the state illustrated in FIGS. 8 and 9. In addition, in some positions of the clips 220, one or more support arm mounts 212 may protrude through the opening 229, as shown in FIGS. 8 and 9.

Figures 6, 7:
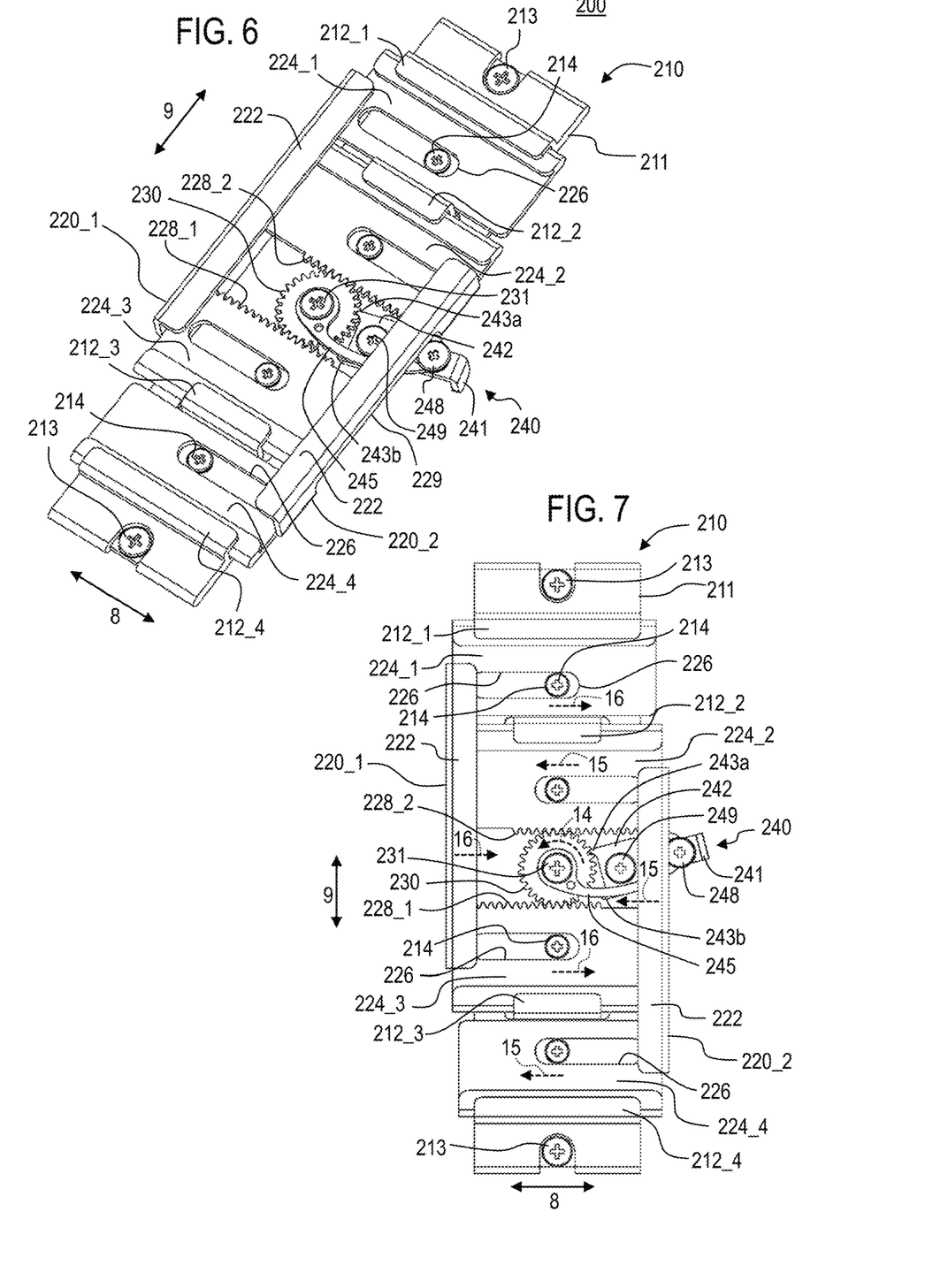
FIG. 6 is a perspective view of the ceiling mount of FIG. 3 in a second state.
FIG. 7 is a plan view of the ceiling mount of FIG. 3 in the second state.

As shown in FIGS. 3-5, one of the support arms 224 of each clip 220 further comprises linear gear teeth 228—specifically, the support arm 224_3 and the support arm 224_2. In FIGS. 3-11, the linear gear teeth 228 are integral to the support arms 224. For example, the linear gear teeth 228 are machined directly into the support arms 224. In other examples, the linear gear teeth 228 may be distinct from and coupled to the support arms 224. As shown in FIGS. 4 and 5, these linear gear teeth 228 are engaged (meshed) with gear teeth of the circular gear 230, which is rotatably coupled to the mounting plate 211, such that translation of the support arms 224 relative to the plate 211 causes rotation of the circular gear 230. As shown in FIG. 3, the circular gear 230 is rotatably coupled to the plate 211 via a screw 231 that extends through an opening (not illustrated) in the circular gear 230 and engages with a screw hole 215 in the plate 211. In other examples, the screw 231 is replaced by another fastener, such as a pin, rivet, stud, or the like. The linear gear teeth 228 of the first clip 220_1 are engaged to one side of the circular gear 230 and the linear gear teeth 228 of the second clip 220_2 are engaged to the opposite side of the circular gear 230, and therefore the first clip 220_1 and the second clip 220_2 are constrained by the circular gear 230 to move concurrently in opposite directions as one another. Specifically, the respective engagement members 222 of the clips 220 can move towards one another (i.e., the engagement member 222 of the first clip 220_1 moves in the direction 16 and the engagement member 222 of the second clip 220_2 moves in the direction 15, as shown in FIG. 7), which causes the circular gear 230 to rotate in a first direction 14, or the engagement members 222 can move away from one another (i.e., the engagement member 222 of the first clip 220_1 moves in the direction 13 and the engagement member 222 of the second clip 220_2 moves in the direction 12, as shown in FIG. 5), which causes the circular gear 230 to rotate in a second direction 11 (opposite the first direction 14). The circular gear 230 can also transfer forces applied to one clip 220 to the other clip 220. For example, if a user were to apply forces to first clip 220_1 to move it in the direction 16, then the circular gear 230 would transfer forces to the clip 220_2 causing the clip 220_2 to move in the opposite direction 15. In addition, if the circular gear 230 is prevented from rotating in the first direction 16, then the respective engagement members 222 of the clips 220 are prevented from moving towards one another (i.e., the clips 220_2 and 220_1 are prevented from moving in directions 15 and 16, respectively). Conversely, if the circular gear 230 is prevented from rotating in the second direction 11, then the respective engagement members 222 of the clips 220 are prevented from moving away from one another (i.e., the clips 220_2 and 220_1 are prevented from moving in directions 12 and 13, respectively).

In addition, the pawl 240 is engageable with the circular gear 230. As shown in FIGS. 3-5, the pawl 240 comprises a free end 241 and an engaged end 242 that engages the circular gear 230. At the engaged end 242, the pawl 240 comprises a first engaging tooth 243a and a second engaging tooth 243b. The pawl 240 is pivotably coupled to the mounting plate 211 via a screw 249, which extends through opening 244 in pawl 240 and engages screw hole 216 in mounting plate 211. In other examples, screw 249 is replaced by another fastener that can serve as a pivot point, such as a pin, rivet, stud, or the like. The pawl 240 can be pivoted between a first state illustrated in FIG. 7 and a second state illustrated in FIG. 5, which will be described in greater detail below.

In the first state of the pawl 240, the first engaging tooth 243a of the pawl 240 engages the circular gear 230, as shown in FIGS. 6 and 7. In this state, a biasing member 245 generates a biasing force that pushes the first engaging tooth 243a into the teeth of the gear 230. The first engaging tooth 243a is configured to allow the circular gear 230 to rotate in a first direction 14 but prevent the circular gear 230 from rotating in a second direction opposite the first direction. Specifically, as the circular gear 230 rotates in the first direction 14, each tooth of the gear 230 that engages with the first engaging tooth 243a can slide along a sloped inner face 243a' (labeled in FIG. 3) of the first engaging tooth 243a and push the first engaging tooth 243a aside, and thus the teeth of the gear 230 can move past the first engaging tooth 243a as the gear 230 rotates in the first direction 14. The biasing force may hold the pawl 240 against the gear 230 during this rotation and thus may generate some resistance to the rotation, but this resistance can be overcome with relatively low forces applies to the clips 220. On the other hand, if it is instead attempted to rotate the circular gear 230 in the direction opposite the direction 14 (i.e., the second direction 11), the teeth of the gear 230 can no longer push past the first engaging tooth 243a because in this state the direction of motion of the gear 230 results in the gear 230 pushing the first engaging tooth 243a deeper into the gear 230, thus jamming the gear 230 and preventing the rotation in the second direction 11. Accordingly, with the pawl 240 in the first state, the engagement members 222 can be moved towards one another, i.e., in the directions 15 and 16 as shown in FIG. 7, but cannot be moved away from one another.

In contrast, in the second state of the pawl 240, the second engaging tooth 243b of the pawl 240 engages the circular gear 230, as shown in FIGS. 4 and 5. The second engaging tooth 243b is configured to allow the circular gear 230 to rotate in the second direction 11 but prevent the circular gear 230 from rotating in the opposite direction (i.e., the first direction 14). Specifically, as the circular gear 230 rotates in the second direction 11, the teeth of the gear 230 push the second engaging tooth 243b away from the gear 230, allowing the gear 230 to rotate. However, if it is attempted to rotate the circular gear 230 in the opposite direction (i.e., the first direction 14), the teeth of the gear 230 push the second engaging tooth 243b into the gear 230, thus jamming the gear 230 and preventing the rotation. Thus, with the pawl 240 in the second state the engagement members 222 can be moved away from one another, i.e., in the directions 12 and 13 as shown in FIG. 5, but cannot be moved towards one another.

The pawl 240 is actuated between the first and second states by applying a force to the free end 241 thereof so as to pivot the pawl 240 between the positions associated with the first and second states. As shown in FIGS. 4-9, the free end of the pawl 240 protrudes laterally beyond the other components of the ceiling mount 200, which can make it relatively easy for a user to access the free end 241 of the pawl 240 and actuate the pawl 240, even when the ceiling mount 200 is mounted to a ceiling rail (such as the ceiling rail 390 in FIG. 11). In addition, as shown in FIGS. 3-5, a biasing member 245 is coupled to the pawl 240 to bias the pawl 240 towards one or both of the states. The biasing member 245 is attached at one end to the pawl 240 via a screw 248 extending through a first opening 246 in the biasing member 245 and engaging a screw hole (not illustrated) in the pawl 240. The biasing member 245 is attached at the other end to the plate 211 via a second opening 247 and the screw 231 (i.e., the same screw that couples the circular gear 230 to the plate 211).

In some examples, the biasing member 245 biases the pawl 240 towards staying in whichever state the pawl 240 is currently in. That is, when the pawl 240 is in the first state the biasing member 245 generates a biasing force that tends to hold the pawl 240 in the first state and resists movement of the pawl 240 to the second state, and when the pawl 240 is in the second state the biasing member 245 generates a biasing force that tends to hold the pawl 240 in the second state and resists movement of the pawl 240 to the first state. As the pawl 240 transitions between the first and second state, the direction of the biasing force changes so as to maintain the pawl 240 in the most recently entered state. Thus, in these examples, to transition the pawl between states an external force may need to be applied to the free end 241 of the pawl 240 to overcome the biasing force, but once the transition occurs the external force can be removed and the pawl 240 will remain in the new state.

In other examples, the biasing member 245 may generate a biasing force that always urges the pawl towards the first state. In these examples, it might not be needed to apply an external force to the pawl 240 to enter the first state, as the biasing force may automatically move the pawl 240 to the first state absent a countervailing external force. In such examples, the pawl 240 can be transitioned to the second state by applying an external force to the free end 241 of the pawl 240 that overcomes the biasing force, but then as soon as the external force is removed the pawl 240 may automatically transition back to the first state due to the biasing force.

As noted above, the engagement members 222 of the clips 220 can change their separation distance to accommodate different rail widths. In particular, to begin a mounting process, the engagement members 222 may be arranged such that their separation distance exceeds the width W of the ceiling rail 390 (i.e., the combined widths of the flanges 391_1 and 391_2). In some examples, it may be desired to exceed the width W of the ceiling rail 390 by some buffer amount to make it easier to position the rail 390 between the engagement members 222 during subsequent steps, described below. If the current separation distance of the engagement members 222 is not large enough, the pawl 240 may be placed in the second state and the engagement members 222 may be moved away from one another (i.e., they may be moved in the directions 12 and 13 shown in FIG. 5) until the desired separation distance is obtained. This state is shown in FIGS. 4 and 5. Once the desired separation distance is obtained, the pawl 240 may be placed in the first state, which allows movement of the engagement members 222 together while preventing movement of the engagement members 222 away from one another. This state is shown in FIGS. 6 and 7. In addition, the ceiling mount 200 may be positioned with the ceiling rail 390 between the engagement members 222, specifically, with the flanges 391 aligned with the engagement members 222, as shown in FIG. 10. In some examples, the transitioning of the pawl 240 to the first state may be performed prior to positioning the ceiling mount 200 at the ceiling rail 390, which may allow the user to perform the action of transitioning the pawl 240 in a more convenient context (e.g., on the ground, with arms not fully extended above the user's head, with better vision, and/or with both hands free) as compared to doing so while the ceiling mount 200 is at the ceiling rail 390. However, in other examples the transitioning of the pawl 240 to the first state may be performed after or concurrently with the positioning of the ceiling mount 200 at the ceiling rail 390. With the pawl 240 in the first state and the ceiling mount 200 positioned at the rail 390, forces may be applied by the user to one or both of the engagement members 222 so as to urge the engagement members 222 to move together (i.e., to move in the directions 15 and 16 as shown in FIGS. 7 and 9), reducing the separation distance between the engagement members 222. The engagement members 222 may be moved towards one another until the engagement members 222 engage with the flanges 391 of the ceiling rail 390, as shown in FIG. 11. FIGS. 8 and 9 illustrate the same state but with the ceiling rail 390 omitted. Because the pawl 240 is in the first state when the engagement members 222 engage the flanges 391, the engagement members 222 are prevented from moving away from one another. Therefore, once the engagement members 222 have engaged the flanges 391, the engagement members 222 cannot be removed therefrom without first transitioning the pawl 240 back to the second state. Thus, the ceiling mount 200 is automatically securely affixed to the ceiling rail 390 without the user needing to take any additional actions to secure the mount 200.

To release the ceiling mount 200 from the ceiling rail 390, the pawl 240 can be actuated from the second state to the first state. This allows the engagement members 222 to be moved away from one another and thus to be disengaged from the rail 390.

It is to be understood that both the general description and the detailed description provide example implementations that are explanatory in nature and are intended to provide an understanding of the present disclosure without limiting the scope of the present disclosure. Other examples in accordance with the present disclosure will be apparent to those skilled in the art based on consideration of the disclosure herein. For example, various mechanical, compositional, structural, electronic, and operational changes may be made to the disclosed examples without departing from the scope of this disclosure, including for example the addition, removal, alteration, substitution, or rearrangement of elements of the disclosed examples, as would be apparent to one skilled in the art in consideration of the present disclosure. Moreover, it will be apparent to those skilled in the art that certain features or aspects of the present teachings may be utilized independently (even if they are disclosed together in some examples) or may be utilized together (even if disclosed in separate examples), whenever practical. In some instances, well-known circuits, structures, and techniques have not been shown or described in detail in order not to obscure the examples. Thus, the following claims are intended to be given their fullest breadth, including equivalents, under the applicable law, without being limited to the examples disclosed herein.

References herein to examples, implementations, or other similar references should be understood as referring to prophetic or hypothetical examples, rather than to devices that have been actually produced (e.g., prototypes), unless explicitly indicated otherwise. Similarly, references to qualities or characteristics of examples should be understood as estimates or expectations based on an understanding of the relevant physical principles involved, application of theory or modeling, and/or past experiences of the inventors, rather than as the results of tests carried out on a physical device, unless explicitly indicated otherwise.

Further, spatial, positional, and relational terminology used herein is chosen to aid the reader in understanding examples of the invention but is not intended to limit the invention to a particular reference frame, orientation, or positional relationship. For example, spatial, positional, and relational terms such as "horizontal", "vertical", "up", "down", "lateral", "beneath", "below", "lower", "above", "upper", "proximal", "distal", and the like may be used herein to describe directions or to describe one element's or feature's spatial relationship to another element or feature as illustrated in the figures. These spatial terms are used relative to reference frames in the figures and are not limited to a particular reference frame in the real world. Furthermore, if a different reference frame is considered than the one illustrated in the figures, then the spatial terms used herein may need to be interpreted differently in that different reference frame. Moreover, the poses of items illustrated in the figure are chosen for convenience of illustration and description, but in an implementation in practice the items may be posed differently.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise.

And/or: Occasionally the phrase "and/or" is used herein in conjunction with a list of items. This phrase means that any combination of items in the list—from a single item to all of the items and any permutation in between—may be included. Thus, for example, "A, B, and/or C" means "one of $\{A\}$, $\{B\}$, $\{C\}$, $\{A, B\}$, $\{A, C\}$, $\{C, B\}$, and $\{A, C, B\}$".

Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition. Moreover, unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within ±1% of the stated value, property, or relationship unless indicated otherwise.

What is claimed is:

1. A ceiling mount for an electronic device, comprising:
a mounting plate configured to be coupled to the electronic device;
two clips configured to engage with opposite sides of a ceiling rail to mount the ceiling mount to the ceiling rail, wherein each of the clips comprises:
an engagement member configured to engage the ceiling rail; and
one or more support arms coupled to the engagement member and movably coupled to the mounting plate such that the engagement member can translate relative to the mounting plate, wherein one of the support arms comprises linear gear teeth;
a circular gear coupled to the mounting plate and engaged with the respective linear gear teeth of both of the clips; and
a pawl engaged with the circular gear and movable between a first state and a second state,
wherein in the first state of the pawl, the engagement members are allowed to be moved toward one another and are prevented from being moved away from one another, and
wherein in the second state of the pawl, the engagement members are allowed to be moved away from one another.

2. The ceiling mount of claim 1,
wherein in the second state of the pawl, the engagement members are prevented from being moved towards one another.

3. The ceiling mount of claim 1,
wherein translation of the engagement members relative to the mounting plate is dependent on rotation of the circular gear.

4. The ceiling mount of claim 3,
wherein in the first state of the pawl, the pawl allows rotation of the circular gear in a first direction and prevents rotation of the circular gear in a second direction opposite the first direction, and
wherein in the second state of the pawl, the pawl allows rotation of the circular gear in the second direction and prevents rotation of the circular gear in the first direction.

5. The ceiling mount of claim 3,
wherein the respective linear gear teeth of the clips are engaged with opposite sides of the circular gear such that the circular gear constrains motion of the engagement members to permit only: concurrent motion of the engagement members towards one another and concurrent motion of the engagement members away from one another.

6. The ceiling mount of claim 1, further comprising:
a biasing member coupled to the pawl and configured to bias the pawl towards the first state.

7. The ceiling mount of claim 1,
a biasing member coupled to the pawl and configured to bias the pawl towards remaining in whichever one of the first state and the second state the pawl is currently in.

8. The ceiling mount of claim 1,
wherein the respective engagement members of the clips are configured to engage flanges protruding in opposite directions from a center portion of the ceiling rail.

9. The ceiling mount of claim 1,
wherein each of the clips comprises two of the support arms.

10. The ceiling mount of claim 1,
wherein each of the support arms of each of the clips extends parallel to a first axis and is movably coupled to the mounting plate such that the engagement members can translate parallel to the first axis.

11. The ceiling mount of claim 10,
wherein each of the engagement members extends perpendicular to the first axis.

12. The ceiling mount of claim 11,
wherein each of the engagement members is configured to engage a flange protruding from a center portion of the ceiling rail along a direction parallel to the first axis.

13. The ceiling mount of claim 1,
wherein for each of the clips, the engagement member comprises an opening through which the pawl and/or one or more of the support arms of the other one of the clips protrudes in one or more positions of the engagement member.

14. The ceiling mount of claim 1,
wherein the respective engagement members of the clips are translatable relative to the mounting plate such that a separation distance between the engagement members is continuously variable within a range that includes a plurality of different widths of a plurality of different types of ceiling rails.

15. A system comprising:
an electronic device; and
a ceiling mount for mounting the electronic device to a ceiling rail, comprising:
a mounting plate configured to be coupled to the electronic device;
two clips configured to engage with opposite sides of a ceiling rail to mount the ceiling mount to the ceiling rail, wherein each of the clips comprises:
an engagement member configured to engage the ceiling rail; and
one or more support arms coupled to the engagement member and movably coupled to the mounting plate such that the engagement member can translate relative to the mounting plate, wherein one of the support arms comprises linear gear teeth;
a circular gear coupled to the mounting plate and engaged with the respective linear gear teeth of both of the clips; and
a pawl engaged with the circular gear and movable between a first state and a second state, wherein in the first state of the pawl, the engagement members are allowed to be moved toward one another and are prevented from being moved away from one another, and wherein in the second state of the pawl, the engagement members are allowed to be moved away from one another.

16. The system of claim 15, further comprising the ceiling rail.

17. The system of claim 16, wherein the ceiling mount is mounted to the ceiling rail and the electronic device is coupled to the mounting plate.

18. The system of claim 15, wherein in the first state of the pawl, the pawl allows rotation of the circular gear in a first direction and prevents rotation of the circular gear in a second direction opposite the first direction, and wherein in the second state of the pawl, the pawl allows rotation of the circular gear in the second direction and prevents rotation of the circular gear in the first direction.

19. The system of claim 18, wherein the respective linear gear teeth of the clips are engaged with opposite sides of the circular gear to constrain motion of the engagement members to:

concurrent motion of the engagement members towards one another dependent on rotation of the circular gear in the first direction, and concurrent motion of the engagement members away from one another dependent on rotation of the circular gear in the second direction.

* * * * *